No. 651,445. Patented June 12, 1900.
T. C. PROUTY.
HYDRAULIC VALVE.
(Application filed Aug. 15, 1899.)
(No Model.)
- FIG. I -
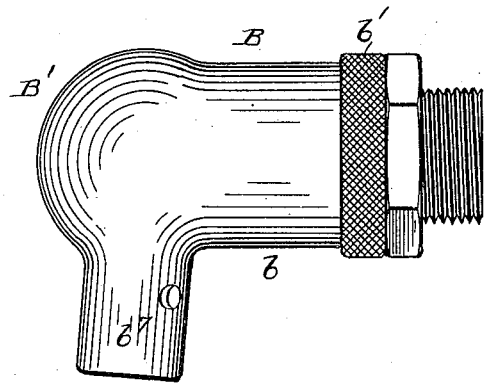
- FIG. II -
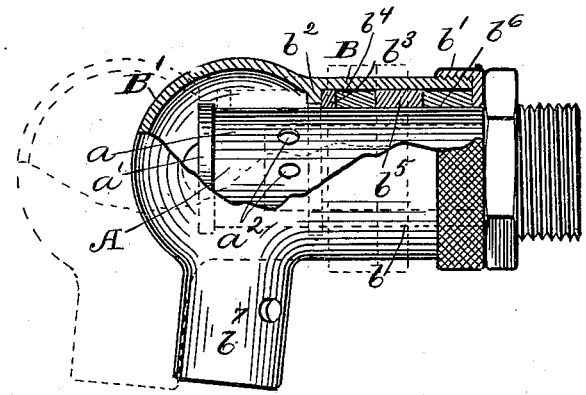
Witnesses,
J. C. Turner
N. E. Merkel
Inventor,
T. C. Prouty
By J. D. Fay
Atty
THE NORRIS PETERS CO., PHOTO-LITHO., WASHINGTON, D. C.

UNITED STATES PATENT OFFICE.

THEODORE C. PROUTY, OF MIDLAND, MICHIGAN.

HYDRAULIC VALVE.

SPECIFICATION forming part of Letters Patent No. 651,445, dated June 12, 1900.

Application filed August 15, 1899. Serial No. 727,256. (No model.)

*To all whom it may concern:*

Be it known that I, THEODORE C. PROUTY, a citizen of the United States, and a resident of Midland, county of Midland, and State of Michigan, have invented a new and useful Improvement in Hydraulic Valves, of which the following is a specification, the principle of the invention being herein explained and the best mode in which I have contemplated applying that principle so as to distinguish it from other inventions.

The object of my invention is to provide an effective valve for controlling the flow of liquids; and it consists of means hereinafter fully described.

The annexed drawings and the following description set forth in detail certain mechanism embodying the invention, such disclosed means constituting but one of various mechanical forms in which the principle of the invention may be used.

In said annexed drawings, Figure I represents an elevation of my improved valve. Fig. II represents a partial sectional central view of the outer member of my improved valve and the inner member in elevation therein, illustrating the open position of the valve.

The inner member A consists of a tube $a$, provided at one end with a stop or disk $a'$ of greater diameter than that of the said tube. The opposite end of said member is formed with a nut and a threaded portion, by means of which it may be secured to the desired water connection. Intermediately of said nut and said disk the shell of said tube is formed with a series of circumferential perforations $a^2$, as shown.

The outer member B is formed with a tubular portion $b$, whose extremity is threaded, as shown in Fig. II, to receive a nut $b'$, which nut is formed with a flange having a bore substantially equal in diameter to the outer diameter of the tube $a$. The inner extremity of said tubular portion $b$ is formed with a shoulder $b^2$, as shown in Fig. II, against which rests a metal ring $b^3$, adjacent to which is located a packing-ring $b^4$, a metal ring $b^5$, and a second packing-ring $b^6$, these four rings being secured in the interior of said tubular portion by the flange on the nut $b'$, and all having an inner diameter substantially equal to the outer diameter of the tube $a$, forming a bearing for the latter in which it slides, thereby permitting the outer member to be relatively retractable. The length of said bearing is less than the length of the tube $a$ between the perforations and its outer end or the nut formed thereon. The member B is further formed with an enlarged portion $B'$ in continuation of the tubular portion $b$, into which the end of the tube $a$ may be caused to project and which is formed with an outlet-nipple $b^7$, whose end is substantially at right angles with the axis of member B, which projects therefrom in an angular direction with reference to the axis of said portion $b$ and through which liquid may escape into any suitable connection attached thereto.

The diameter of the disk $a'$ is slightly less than the diameter of the tubular portion $b$ of the member B at the shoulder, whereby on the retraction of the two members the stop may be caused to abut the ring $b^3$, thereby forming a stop for limiting the travel of the two members. The packing-rings and the intermediate metal ring $b^5$ are so located that when the two members are caused to assume the position shown in dotted lines in Fig. II and in which the extreme position is shown the metal ring $b^5$ will be located directly over the perforations in the tube $a$, thereby effectually shutting off the flow of liquid through the two members. In being caused to assume the opposite extreme position, Fig. II, the nut formed on the member A acts as a stop to limit the travel in this direction, its location, as previously described, being such as to permit the perforations to be uncovered, and thereby allow the fluid to escape from the one member into the other.

The two members being axially rotated, it is seen that the outlet-nipple may be caused to assume various angular positions and the liquid caused to be projected in any desired angular direction with reference to said axis. This feature is especially valuable where it is desired to connect a flexible hose to said nipple, inasmuch as by virtue of the right-angular position of the end of the nipple with reference to the axis of the outer member, and hence the axis of rotation, said hose is prevented from injury due to excessive strains which result from causing the fabric thereof to bend in order to cause the hose to assume the required position in carrying same in the desired direction, which strains occur when a stationary water bib or faucet is utilized.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a hydraulic valve, the combination of two members retractable one within the other, the inner consisting of a tube having the extremity within said outer member closed, and provided with perforations in its lateral shell; said outer member provided with a bearing consisting of two packing-rings and an intermediate ring secured against longitudinal displacement on said member, the length of said bearing being less than the length of said inner member between the perforations and the outer extremity thereof, substantially as set forth.

2. In a hydraulic valve, the combination of a tube provided with a valve-opening in its cylindrical surface and having a stop at its extremity, an outer member slidable upon said tube and having packing-bearing thereon, a flanged nut having threaded engagement upon the outer extremity of said outer member for securing said packing in place, said outer member being closed at the extremity contiguous to the stop upon said tube and provided with an outlet-nipple projecting angularly from said closed end, substantially as set forth.

3. The combination with the outer member $B'$ closed at one end, having the outlet-nipple $b^7$ projecting therefrom and provided on its interior with the packing as shown, secured in place by the flanged nut $b'$, of the inner member forming a bearing for said packing and provided with the valve-opening in its shell and the stop $a'$, substantially as set forth.

Signed by me this 1st day of August, 1899.

THEODORE C. PROUTY.

Attest:
J. C. TURNER,
A. E. MERKEL.